United States Patent [19]

Kobe et al.

[11] Patent Number: 4,907,027
[45] Date of Patent: Mar. 6, 1990

[54] AUTOMATIC EXPOSURE CONTROL DEVICE

[75] Inventors: Takashi Kobe; Masanori Ohtsuka, both of Yokohama, Japan

[73] Assignee: Canon Kabushiki Kaisha, Tokyo, Japan

[21] Appl. No.: 240,359

[22] Filed: Sep. 1, 1988

Related U.S. Application Data

[63] Continuation of Ser. No. 8,750, Jan. 30, 1987, abandoned.

[30] Foreign Application Priority Data

Feb. 3, 1986 [JP] Japan ................................ 61-21535

[51] Int. Cl.⁴ .............................................. G03B 7/08
[52] U.S. Cl. .................................. 354/435; 354/437; 354/439; 354/458; 354/234.1
[58] Field of Search ............................. 354/435–439, 354/452, 458, 234.1, 258.1

[56] References Cited

U.S. PATENT DOCUMENTS

| 4,009,866 | 3/1977 | Iwata et al. | 354/439 |
| 4,053,907 | 10/1977 | Iwata et al. | 354/437 |
| 4,325,614 | 4/1982 | Grimes | 354/437 |
| 4,354,748 | 10/1982 | Grimes et al. | 354/437 |
| 4,572,645 | 2/1986 | Yoshida et al. | 354/435 |

Primary Examiner—Russell E. Adams
Attorney, Agent, or Firm—Fitzpatrick, Cella, Harper & Scinto

[57] ABSTRACT

The present invention relates to an automatic exposure control device for a camera. A shutter controls the amount of the exposure; a detector detects the operation speed of the shutter and calculator device compares an output of the detector with a predetermined speed information to determine the exposure time.

32 Claims, 6 Drawing Sheets

| S5 | S6 |
|----|-----|
| EV 15 | 3mS |
| 13 | 6mS |
| 11 | 12mS |

AUTOMATIC EXPOSURE CONTROL DEVICE

This application is a continuation of application Ser. No. 008,750, filed Jan. 30, 1987, now abandoned.

BACKGROUND OF THE INVENTION

1. Field of the Invention

The present invention relates to an automatic exposure control device for a camera, and more particularly to an improved automatic exposure control device which can control exposure more precisely than a prior art device of similar type.

2. Related Background Art

Most of the recently manufactured cameras are equipped with automatic exposure control devices (referred to as AE hereinafter) so that light intensity measurement, diaphragm control and shutter speed control are automatically carried out. However, the shutter speed which has the biggest influence to the determination of exposure is subject to variation by various reasons because the shutter is a mechanical apparatus. As a result, even in a camera with AE, the exposure may deviate from a proper value.

Such conditions which affect the shutter speed are (i) differences in shutter charaacteristics of individual cameras due to tolerance of parts of the respective shutters (ii) affects of temperature, humidity and gravity in the environment of use of the camera, and (iii) aging or abrasion of the parts due to frequent use of the camera.

In order to attain proper exposure even when there is a variation in the shutter speed by any of the above conditions, it is necessary to detect an actual shutter speed and correct the exposure based on the detected shutter speed. However, AE on an external light intensity measurement camera which has a light intensity measuring device independent from the shutter operation has no such function.

A type of shutter in which the variation of the shutter speed has a significant affect on the exposure is a lens shutter which shares a diaphragm and a shutter. In a camera with a lens shutter, a difference in the shutter characteristics of individual cameras, that is, a difference in the shutter speed, apts to create a variation in the proper exposure of the camera. Since the change of shutter aperture in the lens shutter is usually complex, the exposure time is a complex variable and a high precision exposure control is necessary to determine exact exposure. Accordingly, in the lens shutter, it is necessary to provide a stabilizing mechanism such as a governor in order to simplify the aperture change. However, this leads to an increase in the size of the camera and complexity of the shutter mechanism.

SUMMARY OF THE INVENTION

It is an object of the present invention to provide an improved automatic exposure control device which attains a higher degree of precision exposure control than a prior art automatic exposure control device.

In the automatic exposure control device of the present invention, the actual speed of the shutter blade is detected and the exposure time is adjusted on the basis of the detected object field brightness.

Therefore, in the present device, since the shutter is controlled in accordance with the actually detected shutter speed, the variance in the shutter characteristics is little, even if the shutter speed may differ slightly from camera to camera in view of the difference in the shutter characteristics of the cameras, so long as the cameras are of the same type having the AE devices of the present invention mounted thereon. Further, even if the camera is used in an environment which is significantly different from a normal use condition, the proper exposure is always attained with the camera having the present AE devices mounted thereon.

Since it is not necessary to provide a governor in the shutter, the lens or an internal mechanism of the camera is not complex or large in size and there is space for arranging a light intensity measuring element in a camera body or body tube. Thus, the present AE device is suitable for an external light intensity measurement type camera.

DESCRIPTION OF THE PREFERRED EMBODIMENTS

An embodiment of the present invention applied to a camera with a lens shutter is explained with reference to drawings.

Figure 1:
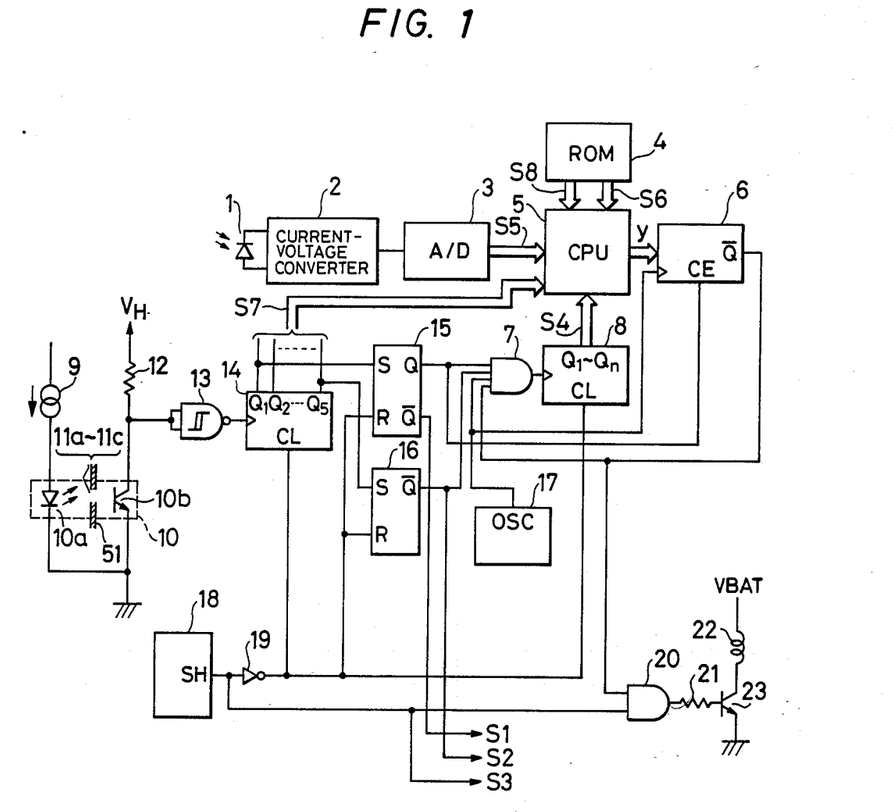
FIG. 1 shows a circuit diagram of a first embodiment of an automatic exposure control device of the present invention.
Figure 2:
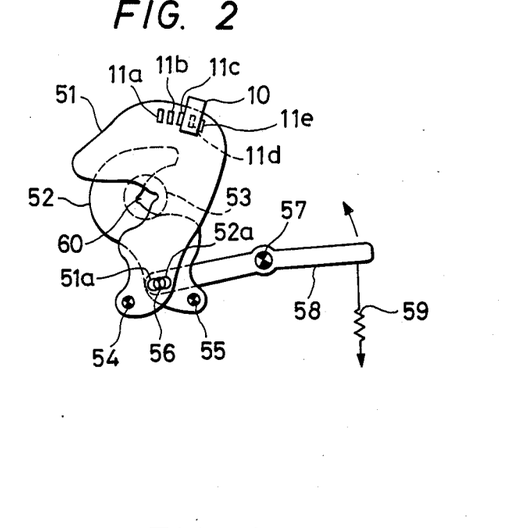
FIG. 2 shows a front view of a lens shutter constructed so as to be controlled by the present device.

FIG. 1 shows a circuit diagram of a first embodiment of the AE device of the present invention, and FIG. 2 shows a front view of a lens shutter mechanism to be controlled by the present device.

In FIG. 2, numeral 51 denotes a swingable first vane pivoted to a gear (not shown) at a shaft 54, and numeral 52 denotes a second vane pivoted to a gear (not shown) at a shaft 55. A generally four-sided shape aperture 60 is formed by portions of peripheries of those vanes. At a maximum aperture of the shutter, the aperture 60 is expanded until it coincides with a maximum aperture 53 of a diaphragm. The vanes 51 and 52 have a slit 51a and a slit 52a, respectively, and a pin projecting from an end of a vane opening lever 58 is inserted into those slits to allow relative sliding movement thereof. The vane opening lever 58 is pivoted to a shaft 57 which is parallel to the shafts 55 and 54 so that it swings around the shaft 57. It is normally biased clockwise (to the direction to close the aperture 60) by a spring 59, and when the shutter is opened, it is rotated counterclockwise by the energization of coil 22 for a solenoid shown in FIG. 1.

Five slits 11a–11e are formed at an equal interval at the top of the first blade 51, and a light source 10a (FIG. 1) of a photo-interrupter and a photo-sensor 10b are mounted on a stationary member (not shown) on both sides of the slits (on both sides of the blade 51). The photo-interrupter 10 is a detector which detects the actual drive speed of the blade 51. As shown in FIG. 1, a current source 9 is connected to a photo-diode of the light source 10a, and a collector of a photo-transistor of the photo-sensor 10b is connected to a power supply $D_H$ through a resistor 12. A pulse-shaping Schmidt inverter 13 is connected to the collector of the transistor, and an output terminal of the Schmidt inverter 13 is connected to an input terminal of a counter 14.

In FIG. 1, numeral 18 denotes a sequence control circuit, numerals 15 and 16 denote flip-flops (RS-FF), numeral 8 denotes a counter, numeral 17 denotes a clock pulse generator, numeral 22 denotes a coil for an electro-magnet for driving the blade opening lever 58, numeral 1 denotes a photo-detector, numeral 2 denotes a current-voltage converter, numeral 3 denotes an A/D converter, numeral 4 denotes a processor or CPU for processing exposure time and exposure amount, numeral 4 denotes a ROM (read-only memory), and numeral 6 denotes a preset counter.

The function of the circuit shown in FIG. 1 is described below. The counter 14 counts the pulses generated by the photo-interrupter 10 as the blade 51 is moved, and generates an output to set the RS-FF 15 and 16. The Q output of RS-FF 15 renders the AND gate 7 conductive to supply the clock pulse to the counter 8, and enables the preset counter 6 to count. The $\overline{Q}$ output of RS-FF 16 terminates the conduction of the AND gate 7 to stop the count operation of the counter 8.

An output S4 of the counter 8 represents the time required for the slits 11e to 11d of the blade 51 to pass through the photo-interrupter 10, or the velocity of the blade 51. On the other hand, the output S7 of the counter 14 represents a distance through which the slits 11e to 11d have passed, or a current diaphragm value (aperture area).

The information stored in the ROM 4 includes a reference opening time S8 during which the blade should have passed through the slit 11d, and an exposure time S6 corresponding to an object field brightness S5 at the reference opening time S8.

The operation of the circuit of FIG. 1 is described below.

In FIG. 1, when a voltage level of an output terminal of a shutter operation control terminal of the sequence control circuit 18 is "L" (low), the shutter is inoperative and the output level of the inverter 19 is "H" (high). Therefore, a signal is applied to the clear terminals of the counters 8 and 14 to clear the counters 8 and 14. Since an H level signal is also applied to the reset terminals of the RS-FF 15 and 16, the RS-FF 15 and 16 are reset. Accordingly, the output level at the $\overline{Q}$ terminal of the RS-FF 15 is "L", the output levels at the $\overline{Q}$ terminals of the RS-FF 15 and 16 are "H" and the AND gate 7 is non-conductive to the output of the clock pulse generator 17. Since the "L" level signal is applied from the Q terminal of the RS-FF 15 to the count enable terminal of the preset counter 6, the preset counter 6 is in a non-count state and the output level at the $\overline{Q}$ terminal thereof is "H".

When a release button of the camera is depressed, the SH terminal of the sequence control circuit 18 assumes the output level "H" and the inverter 19 assumes the output level "L". Thus, the clear signals to the counters 8 and 14 disappears and the reset signals of the RS-FF 15 and 16 are released. On the other hand, since the output of the sequence control circuit is applied to the AND gate 20, the two input levels to the AND gate 20 are "H" and the AND gate 20 is rendered conductive. As a result, the transistor 23 conducts and the coil 22 for the electromagnet connected to the collector thereof is energized. Thus, the blade opening lever 58 is rotated counter-clockwise around the shaft 57 (FIG. 2) by the electromagnet 22, and the blade 51 is rotated clockwise around the shaft 54 and the vane 52 is rotated counter-clockwise around the shaft 55. As a result, as the blade 51 is rotated, the slits 11e to 11a move past the light source 10a and the photo-sensor 10b of the photo-interrupter 10, in this sequence.

Figure 3:
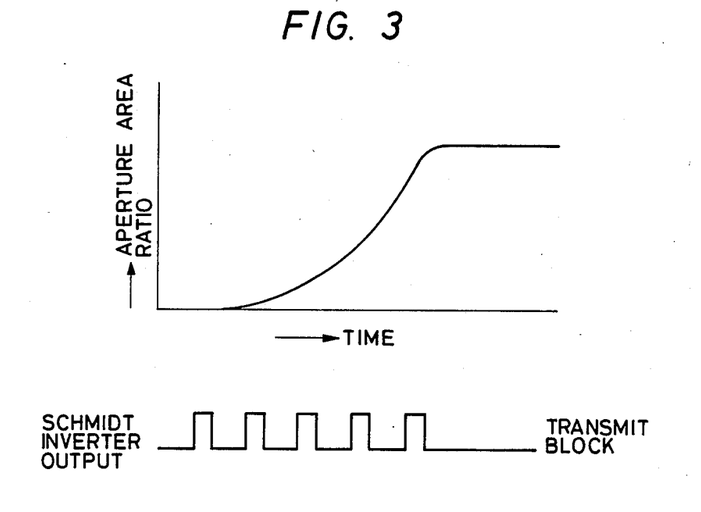
FIG. 3 shows a relationship between an aperture area change rate in the lens shutter of FIG. 2 and a pulse signal applied to the present device of FIG. 1.

Each time each slit moves past the photo-sensor 10b, the photo-transistor of the photo-sensor is turned on and off and the collector potential repeatedly assumes the "K" level (slit is moving past the photo-sensor) and the "H" level (slit has moved past the photo-sensor). Thus, the Schmidt inverter 13 having this potential change applied as an input thereto generates a square wave pulse (shown in FIG. 3B) with the same timing as the turn-on and turn-off of the photo-transistor 10b (FIG. 3 shows the relationship between the change rate of aperture area of the shutter and the output of the Schmidt inverter 13), and it is applied to the input terminal of the counter 14. The voltage level at the $Q_1$ terminal of the counter 14 changes to the "H" level at the rise of the first input pulse and the set input is applied to the RS-FF 15 so that the Q terminal output of the RS-FF 15 changes to the "H" level. Since the three input signal levels to the AND gate 7 except for an input from the clock pulse generator 17 are "H", the output signal of the AND gate 7 has the same timing as the output of the clock pulse generator 17 in accordance with the rise of the clock pulse input from the clock pulse generator 17, and it is applied to the input terminal of the counter 8. Accordingly, when the AND gate 7 conducts to the input from the clock pulse generator 17, that is, when the first slit 11e of the blade 51 is detected by the photo-interrupter 10, the counter 8 starts to count the clock pulse.

On the other hand, since the Q terminal output of the RS-FF 15 is also applied to the count enable terminal CE of the preset counter 6 and the output of the clock pulse generator 17 is applied to an input of the preset counter 6, the clock pulse is also effective to the preset counter 6, and preset counter 6 also starts to count the clock pulse from the time point when the first slit 11e of the blade 51 is detected by the photo-interrupter 10.

The slit 11a passes through the photo-interrupter 10. Then, the last or fifth pulse is supplied to the counter 14 and the output level of the $Q_2$ terminal of the counter 14 changes from "L" to "H". Thus, a set signal is applied to the RS-FF 16 and the output level of the $\overline{Q}$ terminal of the RS-FF 16 changes to "L", the AND gate 7 is rendered non-conductive to the input of the clock pulse generator 17 and the clock input to the counter 8 is blocked. As a result, the count operation of the counter 8 is stopped and meanwhile the current count of the counter 8 is read into the processing circuit 5 by output S4, when the output level of the $Q_2$ terminal of the counter 14 becomes H. (The output S4 represents a value proportional to the time required for the slits 11e to 11d to pass through the photo-interrupter 10, and it is inversely proportional to the actual speed of the blade 51.) The output S4 is temporarily stored into the RAM (readable/writable memory) in the processing circuit 5 and read, as required for use in calculating the exposure time. (As will be explained later, if the processing speed of the processing circuit is not very high, the output S4 may be detected in the previous photographing time or in a preliminary shutter operation which is done before the current photographing operation, and it is stored in the RAM of the processing circuit 5. It may be read from the RAM in the photographing time for use in the calculation of the exposure time. In the embodiment of FIG. 1, it is possible to calculate the exposure by using the output S4 simultaneously with the detection of the output S4.)

On the other hand, the output S7 of the counter 14 ($Q_1$ output to $Q_5$ output) is applied to the processing circuit 5. Since this output S7 represents the rotation angle of the blade 51, it represents the aperture area or the current diaphragm value.

The processing circuit 5 reads in the output S4 of the counter 8 (that is, shutter blade opening speed) and the output S7 of the counter 14 (that is, diaphragm value). The processing circuit retrieves from the ROM 4 the reference opening time S8, during which the blade should have reached the slits $11d$ thereof, and reads in the digital output signal of the photo-sensor 1 from the AD converter 3 through the current-voltage converter 2, as the object field brightness S5, and the reference exposure time S6 corresponding to the object field brightness S5 is read out from ROM 4; the shutter opening time y is calculated and supplies it to the present counter 6.

Figures 4A, 4B:
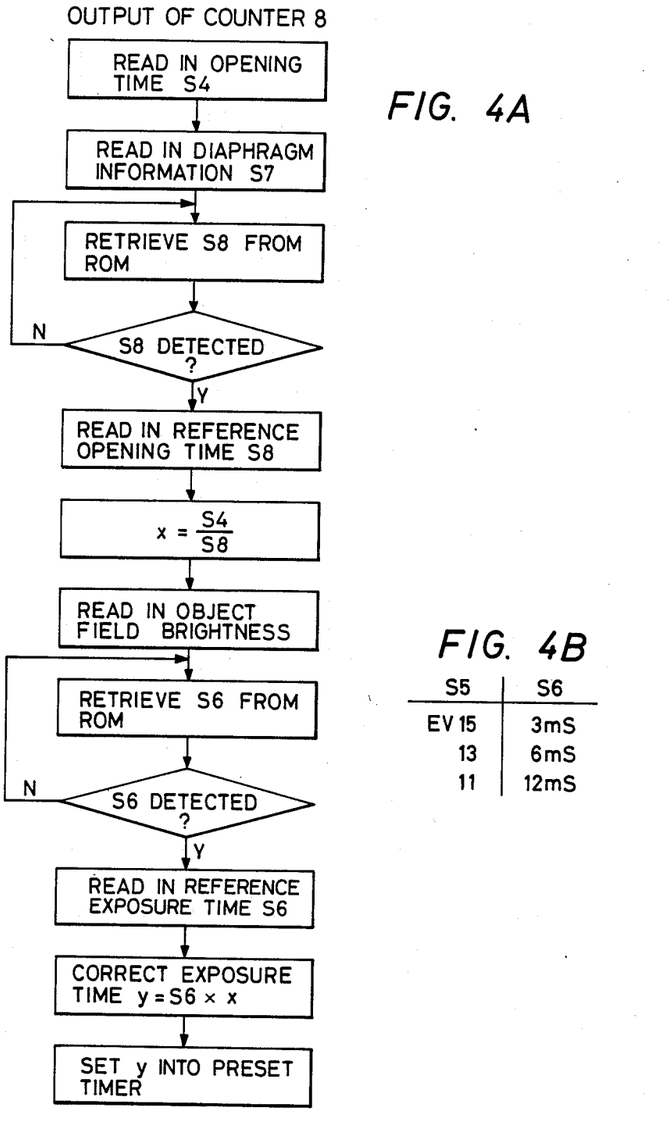
FIG. 4A shows a flow chart of an operation performed by a processing circuit of the device of FIG. 1.
FIG. 4B shows a portion of information stored in a ROM of the device of FIG. 1.

Besides, the relationship between the reference exposure time S6 and the object field brightness S5 and S6 stored in the ROM 4 is shown in FIG. 4B. The reference exposure time S6 represents the exposure time taken when the shutter blade is opened at the reference speed.

FIG. 4A shows a flow chart of the processing carried out by the processing circuit in the shutter semi-open area.

Referring to FIGS. 1 and 4A, the processing by the processing circuit 5 and the operation of the embodiment of FIG. 1 now are explained.

After the processing circuit 5 reads in the output S4 of the counter 8 (that is, the shutter blade opening operation speed), it retrieves from the ROM 4 the reference opening time S8, during which the blade should have reached slit $11d$. The processing circuit 5 then calculates a quotient x by dividing S4 by S8 (that is, a speed ratio x). It also reads in the object field brightness S5 from the AD converter 3, and reads in the reference exposure time S6 corresponding to the object field brightness from the ROM 4, and calculates an exposure correction time y by y=x×S6 and supplies it to the preset counter 6.

Accordingly, the signal level of the $\overline{Q}$ terminal of the preset counter 6 is "L" when the time y has elapsed, and the AND gate 20 is rendered non-conductive to the output from the sequence controller 18, the transistor 23 is rendered non-conductive, the coil for electromagnet 22 is deenergized and the shutter is closed by the spring 59.

In the present embodiment, the fact that the change rate of the aperture area is analogous to the change rate of the shutter opening speed when the shutter blade opening operation speed changes in the shutter semi-open area is utilized (by external condition, temperature moisture etc.). If it is not analogous (that is, if a delay time from the generation of the electrical close signal to the closure of the shutter is not analogous), the data therefor may be stored in the ROM 4 and it may be retrieved in accordance with the opening speed and corrected.

Figure 5:
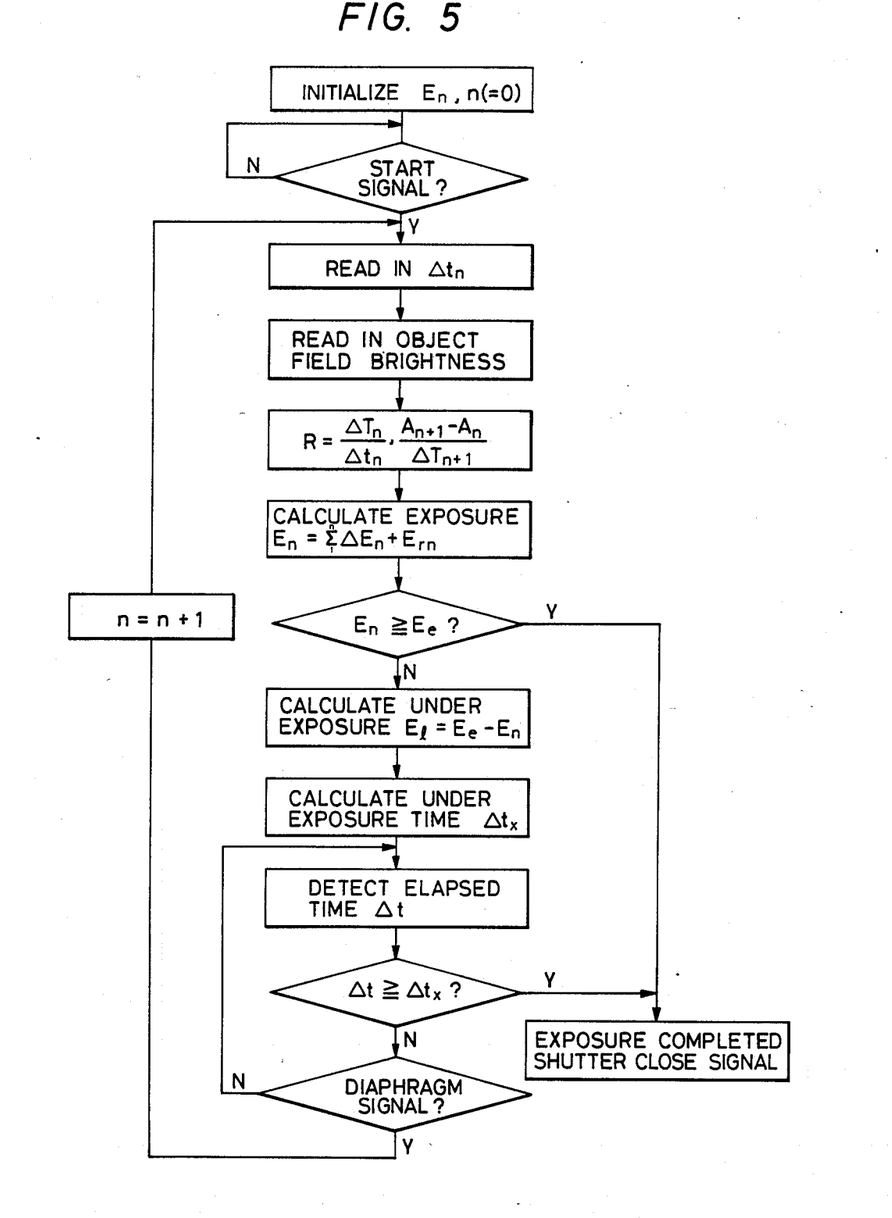
FIG. 5 shows a flow chart of an operation performed by a high speed processing circuit in the device of FIG. 1, FIGS. 6A and 6B show a method for analyzing a change of the shutter aperture in the operation of FIG. 5.

FIG. 5 shows a flow chart of another embodiment for carrying out the calculation described by using the processing circuit 5 having high processing speed.

Figure 6A:
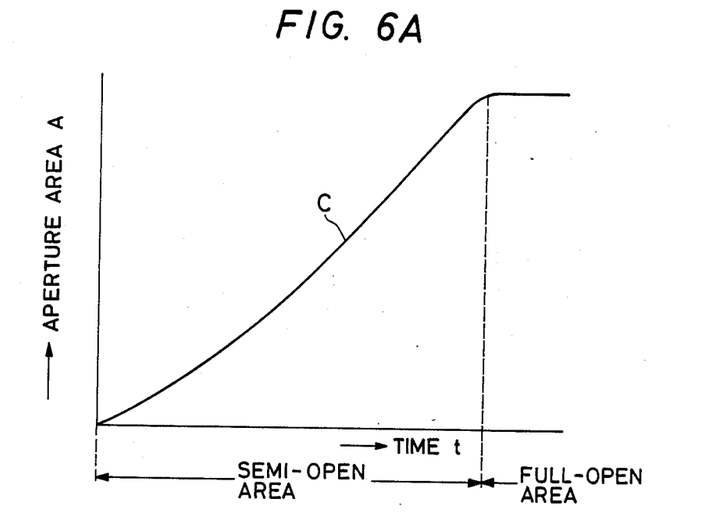
Figure 6B:
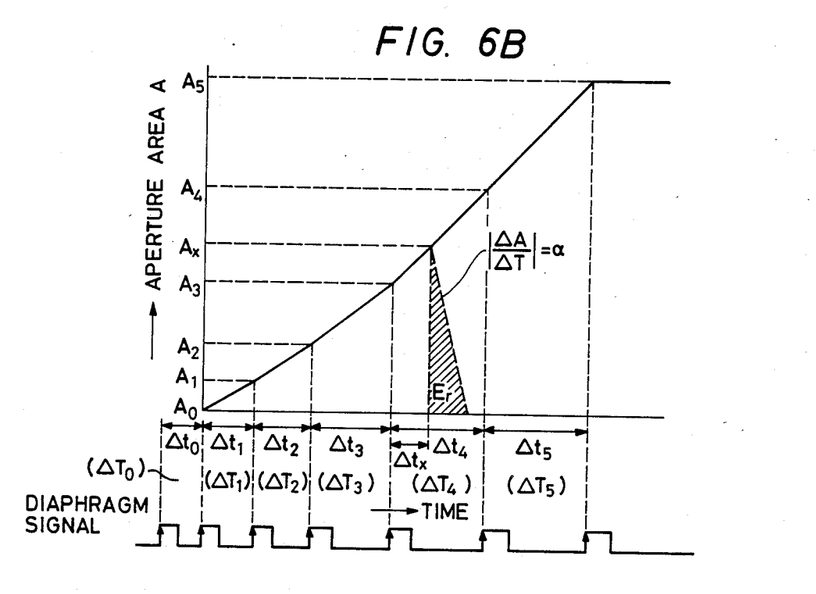

FIGS. 6A and 6B show a change rate C of the aperture area of the lens shutter for the time and illustrates the processing method in the embodiment shown in FIG. 5.

In FIG. 6B the shutter semi-open area is divided into five areas and the curve C representing the aperture area change rate is approximated by straight lines. The actual times in the respective areas are represented by $\Delta t_1$–$\Delta t_5$, the typical times are represented by $\Delta t_1$–$\Delta t_5$, the time at which the blade operation is detected to detect the shutter speed before the aperture is open is represented by $\Delta t_O$ (the time between the rises of the first diaphragm signal and the second diaphragm signal), and the typical time thereof is represented by $\Delta T_O$. (In this case, one more slit is additionally arranged adjacent to the slit 11e in FIG. 1.)

The diaphragm value signal S7 may be detected by detecting the movement of the blade by the non-contact sensor as shown in FIG. 1 or it may be detected by detecting the movement of the blade opening lever 58 by a mechanical sensor.

The timing at which the diaphragm value signal rises is at a time point when the aperture areas in the respective areas reach the respective predetermined values $A_1$–$A_5$. Accordingly, if the processing circuit 5 reads in the signal S4 at a time when the status of the signal S7 has changed in FIG. 1, the velocity of the shutter blade between the diaphragm values can be detected.

In FIG. 6B, the exposure $\Delta E_n$ at each area is given by $$\Delta E_n = L/2\Delta t_n (A_n + A_{n-1}) \quad (1)$$

where
L: object field brightness
$A_n$: Predetermined aperture area of n-th area ($A_0=0$)
n: 1–5

The exposure $E_{rn}$ in each area when the blade returns is given by $$E_{rn} = L/2\alpha A_n^2 \quad (2)$$

where $\alpha$ is a constant gradient of change rate of the aperture from the start of closure of the shutter to full closure.

Accordingly, if the shutter starts to close when the aperture area is $A_n$, the exposure in each area is equal to $E_n + E_{rn}$, and the total exposure is given by:

$$\sum_1^n \Delta E_n + E_{rn} = \frac{L}{2} \sum_1^n \Delta t_n(A_n + A_{n-1}) + \frac{L}{2} \alpha A_n^2 \quad (3)$$

Thus, $$E_e - E_n = \frac{L}{2} \Delta t_x(A_x + A_n) + \frac{L}{2} \alpha A_x^2 \quad (4)$$

where $E_e$ is a proper exposure. $A_x$ is the aperture area when the shutter closure is to be started between the aperture areas, and $\Delta t_x$ is the elapsed time from the previous diaphragm signal rise.

In the method in which the previous shutter speed is utilized, the ratio of the time in the previous aperture area and the predetermined typical time for that area is multiplied by a typical aperture function predetermined for the area of $A_x$ so that $t_x$ and $A_x$ are represented as follows:

$$A_x = \frac{\Delta T_n}{\Delta t_n} \cdot \frac{A_{n+1} - A_n}{\Delta T_{n+1}} \cdot \Delta t_x + A_n \quad (5)$$

In this method, the most precise calculation is attained when the ratio of the blade speed when $\Delta t_n$ is detected and the typical blade speed is subsequently constant. By substituting (5) for (4), the underexposure amount $E_e (=E_e-E_n)$ is calculated as follows:

$$E_e = \frac{L}{2} \cdot \Delta t_x \cdot \left( \frac{\Delta T_n \cdot \Delta A}{\Delta t_n \cdot \Delta T_{n+1}} \Delta t_x + 2A_n \right) + \quad (6)$$

$$\frac{L}{2} \cdot a \cdot \left( \frac{\Delta T_n \cdot \Delta A}{\Delta t_n \cdot \Delta T_{n+1}} \Delta t_x + A_n \right)^2$$

where $\Delta A = A_{n+1} - A_n$ In the formula (6), since values other than $\Delta t_x$ are preset values or known values, the shutter close signal which results in the proper exposure can be obtained by detecting $\Delta t_x$.

As shown in the flow chart of FIG. 5, if $\Delta t_x > t_{n+1}$, the next diaphragm signal corresponding to the aperture area $A_{n+1}$ is produced before the time count for $\Delta t_x$ is completed. Accordingly, $\Delta t_x$ is recalculated as the time from the rise of the diaphragm signal. In the present embodiment, each time the diaphragm signal is produced, the object field brightness is read so that the actual exposure time approaches the measurement time as closely as possible. If the measurement takes a time, the measured value may be stored before the shutter is opened and the stored value may be used.

In the flow chart shown in FIG. 5, a portion which calculates the aperture change by utilizing the detected drive speed of the shutter blade is the portion which calculates the aperture area change rate R.

In the present embodiment, high speed digital processing is suitable for integrating the exposure and calculating the timing of the shutter close signal, but when the processing unit with a low processing speed is used, the blade opening operation speed information detected before the exposure operation may be used, or a somewhat long processing time may be set so that the exposure is calculated while the blade opening operation speed in the exposure operation is detected to delay the start time of the exposure by the preset calculation time.

Figure 7:
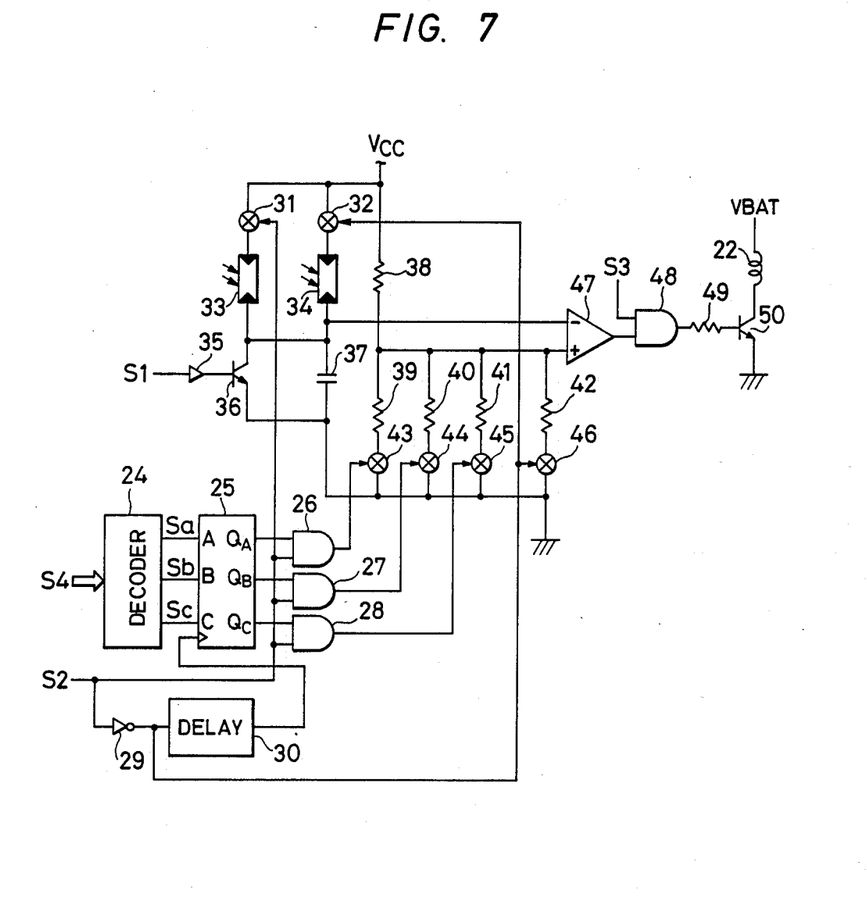
FIG. 7 shows a circuit diagram of a second embodiment of the present invention.

FIG. 7 shows an embodiment in which the AD converter 3, processing circuit 5, preset counter 6 and ROM 4 in the embodiment 1 have been replaced by analog circuits. In the present embodiment, the signals S1-S4 shown in the embodiment of FIG. 1 are used as the input signals. (The circuit excluding the AD converter 3, photo-sensor 1, current-voltage converter 2, ROM 4, calculation circuit 5, preset counter 6, AND gate 20, transistor 23 and resistor 21 are also used in the circuit of FIG. 7.) The output $Q_5$ is applied to the S input terminal of the RS-FF instead of the output $Q_2$, operation may be used or the information between the diaphragm values may be used as the shutter blade opening speed information. In the present embodiment, the shutter blade opening operation speed information S4 is applied to the circuit before the exposure operation is started (or before the shutter opening operation is started).

In FIG. 7, numeral 24 denotes a decoder to which the shutter blade opening operation speed information S4 detected in the previous detection operation is applied, numeral 25 denotes a register to which the decoded outputs Sa, Sb and Sc of the decoder 24 are supplied, numeral 30 denotes a delay circuit, numerals 31, 32 and 43-46 denote analog switches comprising MOSFET's, numerals 33 and 34 denote photo-sensors comprising CDS (Cadmium Sulfide Cell), numeral 35 denotes a buffer amplifier and numeral 47 denotes a comparator.

The decoder 24 supplies the decode outputs Sa-Sc of the shutter blade opening operation speed information S4 detected in the previous photographing operation to the register 25 during the previous photographing operation, and the register 25 latches the input signal and holds it after the photographing operation. Accordingly, before the next exposure operation is carried out, one of the output terminals $Q_A$-$Q_C$ of the register 25 is in the output state and one of the outputs of the register 25 is applied to one of the AND gates 26-28 before the exposure operation starts.

Before the release button of the camera is depressed, the output signal of the sequence control circuit 18 is "L" level and the counters 14 and 8 are reset or cleared, and the RS-FF 15 and 16 are reset. Thus, the output levels of the $\overline{Q}$ terminals thereof are "H", as explained in the embodiment of FIG. 1. Accordingly, before the release button is depressed, the levels of the signals S1 and S2 are "H" and the level of the signal S3 is "L". Since S1 is now "H", the transistor 36 conducts, and one of the input voltages of the comparator 47 having the inverting input terminal thereof connected to the collector of the transistor 36 assumes a ground level as the transistor 36 conducts.

On the other hand, since the signal S2 is "H" level, the analog switch 31 is turned on, the power supply Vcc s connected to the photo-sensor 33 and the voltage of the power supply Vcc is applied to the photo-sensor 33. But, since the transistor 36 conducts, there is no potential change at the inverting input terminal of the comparator 47. Since the signal S2 is "H" level, first inputs of the AND gates 26-28 are conditioned and one of the three outputs of the register 25 is produced ("H" level) as described above. Accordingly, at least one of the AND gates 26-28 is in the "H" level output state and at least one of the analog switches 43-45 is turned on. As a result, a voltage (positive voltage) equal to the power supply voltage Vcc divided by the one of the resistors 39-41 which is in series with the analog switch which is now on and the resistor 38 is applied to the non-inverting input terminal of the comparator 47, and the inverting input terminal is at the ground level. Therefore, the voltage level at the output terminal of the comparator 47 is positive ("H" level) and one of the inputs to the AND gate 48 is conditioned.

On the other hand, since the level of the signal S3 is "L", the output signal of the AND gate 48 is "L" level and the transistor 50 is non-conductive.

In the photographing operation, when the release button of the camera is depressed, the level of the output signal of the sequence control circuit 18 changes from "L" to "H", signal S3 changes to "H" level and the AND gate 48 conducts. Thus, the transistor 50 is turned on, the electromagnet for opening the shutter blade is energized and the shutter opening lever 58 is rotated counterclockwise to start the shutter open operation.

As a result, as explained in the embodiment of FIG. 1, the slits 11e-11a of the blade 51 move past the photo-interrupter in this sequence as the shutter aperture is opened. The counter 14 produces the $Q_1$ output by the first pulse generated by the detection of the first slit 11e by the photo-interrupter 10, and the RS-FF 15 is set thereby. As a result, the level of the signal S1 at the $\overline{Q}$ output thereof changes from "H" to "L". Thus, the base drive current of the transistor 36 is blocked and the transistor 36 is turned off, and the negative terminal of the photo-sensor 33 is connected to the ground level through the capacitor 37 and the inverting input terminal of the comparator 47 is connected in parallel to the photo-sensor 33 and the capacitor 37. Accordingly, a voltage which changes at a time constant determined by a product of the resistance of the photo-sensor 33 and the capacitance of the capacitor 37 is applied to the inverting input terminal of the comparator 47. Since the resistance of the photo-sensor 33 changes with the brightness of the object field light applied to the photo-sensor, the input voltage corresponding to the brightness of the object field light is applied to the inverting input terminal of the comparator 47. If this voltage (which rises at a gradient determined by said time constant) exceeds the voltage applied to the non-inverting input terminal of the comparator 47 (which is equal to the voltage Vcc divided by the resistor 38 and one of the resistors 39–41, as explained before), the output level of the comparator 47 changes from "H" to "L", the output of the AND gate 48 changes to "L" level, the transistor 50 is turned off, the electromagnet 22 is deenergized and the shutter blade opening lever 58 is rotated clockwise in FIG. 2 by the spring 59 to close the shutter. In this case, the exposure is over before the shutter is fully opened (that is, before the slit 11a of the blade 51 comes to the photo-interrupter 10).

However, if the output level of the comparator 47 does not change from "H" to "L" (that is, when the object field light level is lower than the preset level), the transistor 50 is kept on and the blade 51 is further rotated so that the slits 11d–11b sequentially pass through the photo-interrupter 10 and the pulses generated by the respective slits are counted by the counter 14, and the clock pulse after the first pulse is counted by the counter 8 as explained in the embodiment of FIG. 1.

When the last slit a moves past the photo-interrupter 10, the counter 14 produces the $Q_5$ output, the RS-FF 16 is set and the level of the $\overline{Q}$ output thereof changes from "H" to "L". Thus, the counter 8 stops the operation and the level of the signal S2 changes from "H" to "L". As a result, the output of one of the AND gates 26–28 which has been conductive now changes to L level and the analog switches 43–45 are opened. Thus, the resistors 39–41 which have been connected to the non-inverting input terminal of the comparator 47 are now disconnected. The analog switch 32 is opened and the photo-sensor 33 is disconnected from the power supply Vcc.

On the other hand, as the output level of S2 changes, the output potential of the inverter changes from "L" to "H", the analog switches 46 and 32 are turned on, the resistors 38 and 42 are connected to the non-inverting input terminal of the comparator 47 and the photo-sensor 34 is connected to the inverting input terminal of the comparator 47. As a result, the object field light is detected by the photo-sensor 34 and the comparison reference voltage of the comparator 47 is equal to the voltage Vcc divided by the resistors 38 and 42.

The photo sensor 33 has such a characteristic that can set the exposure in the shutter semi-open area, and the photo-sensor 34 has such a characteristic that can set the exposure in the shutter full-open area. The resistors 43–45 and 46 are selected such that they can change the voltage at the output terminal of the comparator 47 from "H" to "L" in the semi-open area and full-open area of the shutter.

As a result, after the photo-sensor and resistor connected to the input terminals of the comparator have been switched (that is, the photo-sensor 33→34, the resistor: 39–41→42), the voltage applied to the inverting input terminal of the comparator 47 becomes equal to the voltage applied to the non-inverting input terminal depending on the object field brightness. As a result, the output voltage level of the comparator 47 changes from "H" to "L", the transistor 50 is rendered non-conductive, the electromagnet is deenergized and the shutter is rapidly closed by the spring 59.

On the other hand, when the level of the signal S2 changes to "L", the output voltage level of the inverter 29 is "H", an input signal is applied to the delay circuit 30, and after a predetermined delay time, the output signal of the delay circuit 30 is applied to the register 25 as a strobe signal (latch signal). As a result, the decode output signal Sa–Sc of the decoder 24 which receives the shutter blade opening operation time signal S4 from the counter 8 are latched in the register 25. Accordingly, after the exposure operation, the input signals Sa–Sc are kept in the register 25, which generates the output signals $Q_A$–$Q_C$ corresponding to the input signals Sa–Sc.

The decoder 24 generates the decode outputs which rank the opening speed of the input signal S4 from the counter 8.

The decode signals Sa–Sc, the resistances of the resistors 39–41 which are references to the comparator 47, the shutter blade opening operation speed and the exposure time have the following relationship.

TABLE

| Decode Signal | Shutter blade opening operation speed | Resistance | Exposure time |
|---|---|---|---|
| Sa = "H" | High | Low | Short |
| Sb = "H" | Medium | Medium | Medium |
| Sc = "H" | Low | High | Long |

For the output $Q_A$ to the decode signal Sa, the resistance of the resistor 39 is set low, and the resistor for the decode signal Sc is set high. Accordingly, when the shutter opening speed is high, the reference of the comparator is set low and the shutter close signal is generated earlier after the start of the shutter opening operation.

In the present embodiment, the exposure time in the shutter semi-open area is set in three steps, although the number of steps may be increased as required. When the number of steps is increased, the exposure time can be more precisely controlled.

In FIG. 7, the circuit portion comprising the decoder 24, resistor 25, AND gates 26–28, analog switches 43–45 and resistors 39–41 may be replaced by an integrator including a capacitor so that a voltage produced by integrating the signal S4 is used as the reference voltage of the comparator 47.

In any case, the present invention is not limited to the illustrated embodiment and various circuit configurations may be used.

In the above-embodiment, the present invention is explained in connection with the lens shutter but the present invention may also be applied to a focal plane shutter, a rotary blade shutter or any other shutter.

As described hereinabove, since the present device detects the actual opening operation speed of the shutter blade and performs the adjustment of the exposure time, a very high precision exposure control is attained, and the exposure error due to tolerance of the shutter parts, characteristic differences of the camera shutter, the effect of temperature, humidity and gravity in a use environment of the camera, and the effect of aging of the shutter parts, can be compensated.

Accordingly, when the exposure control device of the present invention is mounted on the lens shutter camera of the external light intensity measurement type, a high precision exposure control is attained without providing stabilizing mechanism such as a governor in the lens shutter. Thus, the increase of size of the camera is prevented, and the lens shutter camera can be an external light intensity measurement type camera having a high freedom to the arrangement of the photo-sensor.

What we claimed is:

1. An exposure control apparatus comprising:
    shutter means for controlling the amount of the exposure;
    detection means for detecting the operation speed of said shutter means;
    calculation means for comparing an output of said detection means with a predetermined speed information to previously determine the exposure time; and
    control means for measuring an operating time of said shutter means and for causing said shutter means to start a closing operation when said operating time reaches said previously determined exposure time;
    wherein the operation speed of the shutter means is independent of the output of the control means.

2. An apparatus according to claim 1, wherein said detection means comprises means for detecting the opening operation speed of said shutter means.

3. An apparatus according to claim 1, wherein said calculation means comprises means for calculating the ratio of the value of the output of said detection means to said predetermined speed information.

4. An apparatus according to claim 1, wherein said calculation means comprises memory means for storing said output of said detection means.

5. An apparatus according to claim 4, wherein said memory means comprises means for storing an output of said detection means when said detection means previously operated.

6. An apparatus according to claim 1, wherein said calculation means comprises determination means for determining a reference exposure time in response to the object brightness, and said calculation means adjusts the output of said determination means on the basis of the comparison of the output of said detection means and said predetermined speed information.

7. An apparatus according to claim 1, wherein said calculation means comprises means for making said exposure time short when the operation speed of said shutter means becomes high, and for making said exposure time long when the operation speed of said shutter means becomes slow.

8. An exposure control apparatus comprising:
    shutter means for controlling the amount of the exposure;
    discrimination means for discriminating the operation speed of said shutter means;
    reference value output means for providing a predetermined reference speed value; and
    calculation means for determining the exposure time on the basis of the ouputs of said determination means and said reference value output means; and
    control means for measuring an operating time of said shutter means and for causing said shutter means to start a closing operation when said operating time reaches said previously determined exposure time;
    wherein the operation speed of the shutter means is independent of the control means.

9. An apparatus according to claim 8, wherein said discrimination means comprises means for discriminating the opening operation speed of said shutter means.

10. An apparatus according to claim 8, wherein said calculation means comprises means for storing an output of said discrimination means when said shutter previously operated.

11. An apparatus according to claim 8, wherein said calculation means comprises determination means for determining a reference exposure time in response to the object brightness, and said calculation means adjusts an output of said determination means on the basis of outputs of said discrimination means and said reference value output means.

12. An apparatus according to claim 8, wherein said calculation means comprises means for making said exposure time short when the operation speed of said shutter means becomes high, and for making said exposure time long when the operation speed of said shutter means becomes slow.

13. An exposure control apparatus comprising:
    shutter means for controlling the amount of the exposure;
    discrimination means for discriminating the operation speed of said shutter means;
    determination means for previously determining the exposure time on the basis of an output of said discrimination means; and
    control means for measuring an operation time of said shutter means, and causing said shutter means to start a closing operation when said operation time reaches said previously determined exposure time;
    wherein the operation of the shutter means is independent of the control means.

14. An apparatus according to claim 13, wherein said discrimination means comprises means for discriminating the opening operation speed of said shutter means.

15. An apparatus according to claim 13, wherein said determination means comprises means for storing an output of said discriminating means of the previous operation of said shutter means.

16. An apparatus according to claim 13, wherein said determination means comprises means for making said exposure time short when the operation speed of said shutter means becomes high, and for making said exposure time long when the operation speed of said shutter means becomes slow.

17. A camera comprising:
    shutter means for controlling an amount of exposure;
    detection means for detecting an operation speed of said shutter means;
    determination means for previously determining a starting timing of closing of said shutter means on the basis of an output of said detection means;

wherein the operation speed of the shutter means is indpendent of the determination means.

18. A camera according to claim 17 further comprising:
operation means for measuring an operation time of said shutter means and closing said shutter means when said operation time corresponds with said closing timing.

19. A camera according to claim 17, wherein said detection means comprises means for detecting the opening operation speed of said shutter means.

20. A camera according to claim 17, wherein said detection means includes comparing means for comparing an output of said detection means with a reference value.

21. A camera according to claim 20, wherein said comparing means includes means for determining said closing timing by calculating the ratio of said reference value to the output of said detection means.

22. A camera according to claim 17, further comprising memory means for storing the output of said detection means.

23. A camera according to claim 17, wherein said determination means includes means for determining said closing timing on the basis of object brightness.

24. A camera according to claim 17, wherein said determination means comprises means for making said closing timing early when the operation speed of said shutter means is fast, and for delaying said closing timing when the operation speed of said shutter means is slow.

25. A camera comprising:
shutter means for controlling an amount of exposure;
discrimination means for discrimination the operation state of said shutter means;
determination means for previously determining a starting timing of closing of said shutter means on the basis of an output of said discrimination means;
wherein the operation speed of the shutter means is independent of the determination means.

26. A camera according to claim 25, further comprising:
operation means for measuring an operation time of said shutter means and closing said shutter means when said operation time corresponds with said closing timing.

27. A camera according to claim 25, wherein said discrimination means includes means for detecting the opening operation speed of said shutter means.

28. A camera according to claim 25, wherein said determination means includes comparing means for comparing an output of said discrimination means with a basic value.

29. A camera according to claim 28, wherein said comparing means includes means for determination said closing timing by calculating the ratio of said basic value to the output of said discrimination means.

30. A camera according to claim 25, further comprising memory means for storing the output of said detection means.

31. A camera according to claim 25, wherein said determination means includes means for determining said closing timing on the basis of object brightness.

32. A camera according to claim 25, wherein said determination means includes means for advancing said closing timing when the operation speed of said shutter means is fast, and for delaying said closing timing when the operation speed of said shutter means is slow.

* * * * *

UNITED STATES PATENT AND TRADEMARK OFFICE
CERTIFICATE OF CORRECTION

PATENT NO. : 4,907,027
DATED : March 6, 1990
INVENTOR(S) : Takashi Kobe, et al.

It is certified that error appears in the above-identified patent and that said Letters Patent is hereby corrected as shown below:

COLUMN 5:

Line 19, "circuit" should read --circuit 5--.

Line 29, "Besides, the" should read --The--.

COLUMN 6:

Line 44, "$E_{rn}=L/2\alpha A_n 2$" should read --$E_{rn}=L/2\alpha A_n^2$--.

COLUMN 7:

Line 9, "when" (second occurrence) should be deleted.

Line 21, " $A=A_{n+1}-A_n$ In" should read -- $A=A_{n+1}-A_n$

¶ In--.

COLUMN 8:

Line 35, "s" should read --is--.

UNITED STATES PATENT AND TRADEMARK OFFICE
CERTIFICATE OF CORRECTION

PATENT NO. : 4,907,027        Page 2 of 3
DATED      : March 6, 1990
INVENTOR(S): Takashi Kobe, et al.

It is certified that error appears in the above-identified patent and that said Letters Patent is hereby corrected as shown below:

COLUMN 9:

Line 43, "slit a" should read --slit 11a--.

COLUMN 10:

Line 57, "preciseIy" should read --precisely--.

COLUMN 11:

Line 22, "claimed" should read --claim--.

COLUMN 12:

Line 4, "and" should be deleted.

Line 6, "determination" should read --discrimination--.

Line 66, "determinating" should read --determining--.

Line 5, after "for" should read --previously--.
   Line 6, after "of" (1st Occur) delete "the".

UNITED STATES PATENT AND TRADEMARK OFFICE
CERTIFICATE OF CORRECTION

PATENT NO. : 4,907,027                        Page 3 of 3
DATED      : March 6, 1990
INVENTOR(S): Takashi Kobe, et al.

It is certified that error appears in the above-identified patent and that said Letters Patent is hereby corrected as shown below:

COLUMN 13:

Line 2, "indpendent" should read --independent--.

Line 3, "claim 17" should read --claim 17,--.

COLUMN 14:

Line 1, "discrimination" (second occurence) should read --discriminating--.

Line 2, "means;" should read --means; and--.

Line 22, "determination" should read --determining--.

Signed and Sealed this

Tenth Day of September, 1991

Attest:

HARRY F. MANBECK, JR.

Attesting Officer

Commissioner of Patents and Trademarks